(12) United States Patent
Brandt

(10) Patent No.: US 11,370,208 B2
(45) Date of Patent: Jun. 28, 2022

(54) APPLICATORS FOR DIE-CUT PARTS, METHODS FOR APPLYING DIE-CUT PARTS TO SURFACES, AND DIE-CUT PART STRIPS

(71) Applicant: tesa SE, Norderstedt (DE)

(72) Inventor: Hans-Peter Brandt, Schenefeld (DE)

(73) Assignee: TESA SE, Norsderstedt (DE)

( * ) Notice: Subject to any disclaimer, the term of this patent is extended or adjusted under 35 U.S.C. 154(b) by 320 days.

(21) Appl. No.: 16/234,856

(22) Filed: Dec. 28, 2018

(65) Prior Publication Data
US 2019/0217590 A1    Jul. 18, 2019

(30) Foreign Application Priority Data
Jan. 12, 2018 (DE) ...................... 10 2018 200 439.0

(51) Int. Cl.
| | |
|---|---|
| B32B 37/00 | (2006.01) |
| B32B 7/12 | (2006.01) |
| B32B 38/04 | (2006.01) |
| B65C 1/02 | (2006.01) |
| B65C 9/36 | (2006.01) |

(Continued)

(52) U.S. Cl.
CPC ............ *B32B 37/0046* (2013.01); *B32B 7/12* (2013.01); *B32B 27/06* (2013.01); *B32B 38/04* (2013.01); *B65C 1/021* (2013.01); *B65C 9/1869* (2013.01); *B65C 9/36* (2013.01); *B32B 2038/042* (2013.01)

(58) Field of Classification Search
CPC ....... B32B 37/0046; B32B 7/12; B32B 27/06; B32B 38/04; B32B 2038/042; B65C 1/021; B65C 9/36; B65C 9/1869; B65C 9/18; B65H 35/0033; B65H 2701/377; B65H 2701/194; B65H 2801/75; B65H 37/04; B65H 18/103; B65H 2301/5161; B65H 2555/31; B65H 2553/80; B65H 2701/19
See application file for complete search history.

(56) References Cited

U.S. PATENT DOCUMENTS

| | | | | |
|---|---|---|---|---|
| 4,397,709 | A | * 8/1983 | Schwenzer | ........... B65C 9/1815 156/351 |
| 4,842,673 | A | * 6/1989 | Kurihara | ................. B29C 65/78 156/541 |

(Continued)

FOREIGN PATENT DOCUMENTS

| | | |
|---|---|---|
| DE | 19621857 A1 | 12/1997 |
| DE | 10 2007 058 765 A1 | 6/2009 |

(Continued)

OTHER PUBLICATIONS

Definition of "die" from Merriam Webster Dictionary (merriam-webster.com/dictionary/die) (Year: 2021).*

(Continued)

*Primary Examiner* — Cynthia L Schaller
(74) *Attorney, Agent, or Firm* — Norris McLaughlin, P.A.

(57) ABSTRACT

An applicator for die-cut parts, having a die-cut part strip with die-cut parts applied along a retaining belt, said parts having a carrier layer and an adhesive layer, the carrier layer being disposed between the retaining belt and the adhesive layer, and a punch head over which the die-cut part strip runs, where the die-cut parts running over the punch head face away from the punch head by their adhesive layer, and the die-cut parts can be pressed by means of the punch onto a surface.

6 Claims, 4 Drawing Sheets

Figure 1:
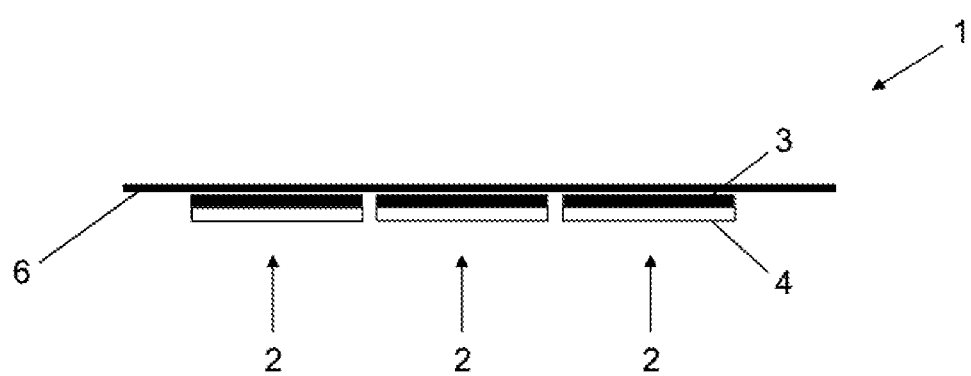

(51) Int. Cl.
*B65C 9/18* (2006.01)
*B32B 27/06* (2006.01)

(56) References Cited

U.S. PATENT DOCUMENTS

| | | | |
|---|---|---|---|
| 5,048,718 A * | 9/1991 | Nakamura | B65B 9/073 |
| | | | 221/35 |
| 8,671,861 B2 | 3/2014 | Konig et al. | |
| 2002/0108718 A1 | 8/2002 | Yeh | |
| 2009/0145558 A1 | 6/2009 | Saluz | |
| 2013/0248116 A1 * | 9/2013 | Gratzer | B44C 1/18 |
| | | | 156/538 |
| 2014/0024756 A1 * | 1/2014 | Krawinkel | C09J 7/387 |
| | | | 524/271 |

FOREIGN PATENT DOCUMENTS

| | | |
|---|---|---|
| DE | 10 2010 020 623 A1 | 12/2010 |
| JP | H 05232877 A | 9/1993 |
| JP | 10258818 A | 9/1998 |
| JP | 2005301725 A | 10/2004 |
| JP | 2005-301725 A | 10/2005 |
| JP | 2015510234 A | 8/2013 |
| KR | 10-2013-0094974 A | 8/2013 |

OTHER PUBLICATIONS

German Office Action corresponds to German Application No. 10 2018 200 439.0 dated Sep. 28, 2018.
English translation of Korean Office Action dated Oct. 24, 2019, in connection with Korean Patent Application No. 10-2019-0003969.
Office Action for JP 2019-003264 dated Feb. 14, 2020 (Translation only).
English translation of Chinese Office Action dated Jul. 3, 2020, in connection with Chinese Patent Application No. 201910004045.9.

* cited by examiner

APPLICATORS FOR DIE-CUT PARTS, METHODS FOR APPLYING DIE-CUT PARTS TO SURFACES, AND DIE-CUT PART STRIPS

This application claims foreign priority benefit of German Application No. DE 10 2018 200 439.0, filed Jan. 12, 2018, the disclosure of which patent application is incorporated herein by reference.

The invention relates to an applicator for die-cut parts with a die-cut part strip with die-cut parts applied along a retaining belt and having a carrier layer and an adhesive layer. The invention also relates to a method for applying die-cut parts to a surface. The invention also relates to a die-cut part strip having a belt strip and a row of die-cut parts disposed alongside one another on the belt strip.

A frequent problem arising in the production of motor vehicles is that openings that have been made in bodywork parts have to be bonded closed again after processing operations. For example, bodywork parts may be surface-treated with liquid. The liquid needed for the surface treatment runs off automatically via openings made beforehand in the bodywork parts. Subsequently, the openings are closed again. Frequently, the openings are closed by hand, by taking die-cut parts from a die-cut part strip or a die-cut part sheet and adhering them by hand onto the openings. The die-cut parts have a carrier layer and an adhesive layer applied on one side of the carrier layer. The adhesive layer is generally applied over the full area of the carrier layer.

In the prior art, furthermore, robot arms are known.

For this purpose, a die-cut part roll is provided, with a die-cut part strip conventionally wound on said roll. The die-cut part strip is generally a liner present in tape form. On this liner, spaced apart from one another in a row, die-cut parts with carrier layer and adhesive layer are applied in such a way that the free side of the adhesive layer is adhered on the liner, so that the side of the adhesive layer opposite the liner is covered by the carrier layer, so that the adhesive is fully protected. The die-cut part strip can then be wound up, specifically in such a way that the liner is disposed on the outside of a turn and the die-cut parts on the inside of a turn on a die-cut part roll. Conventionally, the free end of the die-cut part strip is drawn off and clamped into an apparatus, and a robot arm draws the die-cut parts off from the die-cut part strip in succession, by suction. For this purpose, the robot arm has a trunk-like design and attaches by suction the die-cut part to the carrier layer, detaches it from the liner, and presses the die-cut part onto the opening in the mandated position.

Disadvantageously, this process is relatively time-consuming, since the robot arm has to be moved back to the die-cut part roll again after each bonding operation, in order to detach the next die-cut part from the die-cut part strip.

Furthermore, applicators in the form of label dispensers are known. In this case, the label dispenser is disposed on a robot arm. The label dispenser has the die-cut part roll. The die-cut part roll is guided to a press roll and the liner is automatically stripped off, and the die-cut part is pressed onto the hole by displacement of the label dispenser with the aid of the press roll. Disadvantageously, this process has a fairly large footprint, since the label dispenser has to be drawn over a certain distance by means of the robot arm. This is disadvantageous, for example, in regions of an automotive panel that are difficult to access, as for example if the opening requiring closure is sited directly adjacent to a highly curved edge.

It is an object of the present invention, therefore, to provide an applicator which reduces the disadvantages identified above. It is also an object of the invention to provide a method with which die-cut parts can be adhered and the above-stated disadvantages are avoided. It is also an object of the invention, lastly, to provide a die-cut part strip with which the above-stated method can be carried out.

In respect of the applicator, the object is achieved by an applicator comprising the features set forth hereinafter.

The applicator of the invention for die-cut parts comprises a die-cut part strip with die-cut parts applied along a retaining belt. The die-cut parts each have a carrier layer and an adhesive layer, the carrier layer being disposed between the retaining belt and the adhesive layer. Relative to the prior art, therefore, the die-cut parts of the invention are applied invertedly, so to speak, on the retaining belt. The applicator of the invention comprises a punch having a punch head, over which the die-cut part strip runs, with the die-cut parts running over the punch head facing away from the punch head by their adhesive layer. As a result it is possible that the die-cut parts can be pressed by means of a punch onto a surface.

There is preferably a control system provided. The control system comprises a first sensor, which with a scanning region is directed at the punch head and registers the presence of a die-cut part at the punch head. The control system is signal-conductingly connected to the sensor, and sensor measurements are supplied to the control system. According to one particularly preferred variant, the applicator is secured on a freely movable robot arm. The robot arm controls, firstly, a back-and-forward movement of the applicator in the z-direction, perpendicular to the surface, and secondly controls a movement in an xy-plane parallel to the surface. The robot arm is capable of responding accordingly to the control signals.

Furthermore, the cycled propulsion of the die-cut part strip is controlled, allowing the subsequent die-cut part to be positioned on the punch head. The propulsion of the die-cut part strip may take the form of a driven first winding roller for the retaining belt.

When the first sensor signals the presence of a die-cut part at the punch head and passes a corresponding measurement to the control system, the propulsion of the die-cut part strip is halted, and a signal is supplied to the robot, and the robot moves the applicator together with punch head towards the surface in a forward movement and back from the surface in a back movement. The extent of the forward movement is such that the die-cut part adheres on the surface. For this purpose, a corresponding pressure sensor may be arranged on the punch, this sensor registering the pressure resistance by the surface.

So that the applicator is brought from the first position to the next position, the control system is preferably programmed with an opening pattern or adhesive-bonding pattern in the robot control. The control system may for this purpose be designed as an NC controller. It is also conceivable for a second sensor to be provided, registering the holes as it runs over the surface. A combination of NC controller and sensor technology may also be provided.

Favourably, the control system activates the robot, which moves the applicator together with punch head into a first position above the surface and adheres the die-cut part at a first surface position. After the adhering of the die-cut part, it activates the robot again and moves the applicator together with punch head in xy-direction into a second position above the surface; there, the next die-cut part is adhered, through a forward motion in z-direction, onto the next opening.

Favourably, a die-cut part roll is provided on a supply side of the punch head, and a first winding roller on a removal side of the punch head. The first winding roller is signal-conductingly connected to the control system, and this roller is able to receive, in wound form, the belt strip of the die-cut part strip. The control system rotates the first winding roller cyclically. The advance distance in one cycle here corresponds in each case to the distance between adjacent die-cut parts on the die-cut part strip.

In another preferred embodiment of the invention, a second winding roller is provided on the supply side, to wind up a liner. The free adhesive side of the die-cut part strip may optionally be covered with a liner. In that case the liner on the second winding roller must be peeled off on the supply side before the die-cut part is supplied to the punch head.

The object is also achieved by an aforementioned method comprising the features set forth hereinafter.

The method is suitable for implementation with one of the abovementioned applicators; conversely, the applicators are also suitable for implementing one of the following methods.

In accordance with the invention, a die-cut part strip with die-cut parts applied along a retaining belt is moved via a punch head of a punch which is displaceable back and forward, the die-cut parts having a carrier layer and an adhesive layer, and the carrier layer being disposed between the retaining belt and the adhesive layer.

In accordance with the invention, the die-cut part strip is halted when a die-cut part is positioned over the punch head, and the punch is then moved by means of a robot onto the surface, in a forward movement, and the die-cut part is stuck to the surface. During the forward movement, the die-cut part strip is advanced a little, so that the die-cut part does not slip from the punch head. Similarly, during the back movement, the die-cut part strip is likewise held tautly by advancement of the die-cut part strip.

The method of the invention makes it possible, in a simple way, to position die-cut parts on a surface, more particularly on openings; the die-cut part here is of course selected to have a diameter somewhat greater than the opening, producing an adhesive margin. Of course, the die-cut parts may also be bonded at positions other than on openings, as well.

Because of the back-and-forward movement of the punch head in the z-direction, only very little space is needed in xy-direction to apply a die-cut part to a surface. This is an advantage relative to the known label dispensers.

Furthermore, it is preferably possible for a first position to be determined on the surface, for the die-cut part to be stuck to the first position, and for a second position to be determined and for the punch to be moved to the second position during the onward cycling of the die-cut part strip. With preference, the next die-cut part is already disposed on the die-cut part head again when the punch has reached its envisaged second position. This is a considerable time saving relative to the known robot arm.

With preference, a first sensor may be directed at the punch head and is able to recognize the presence of the die-cut part. When the die-cut part is recognized, the die-cut part strip is halted and, when the punch has reached its position above the surface, the punch is moved to the surface, the die-cut part is adhered, and the die-cut part strip is cycled on by one die-cut part. The robot is designed for displacing the applicator in the xy-plane parallel to the surface, while the back-and-forward movement of the punch takes place in z-direction.

The control system also controls the speed and the angle of a winding roller on which the belt strip is wound and also, optionally, the speed and the rotational angle of a second winding roller, on which an optional liner can be wound.

The invention is achieved, in a third aspect, by means of a die-cut part strip having the features set forth hereinafter.

The die-cut part strip of the invention has a belt strip and a row of die-cut parts disposed alongside one another on the belt strip, said parts each having a carrier layer and an adhesive layer, the carrier layer being disposed between the belt strip and the adhesive layer. Relative to the known die-cut part strips, the die-cut parts are applied upside down, as it were, on the belt strip. The adhesive layer is free and may be adhered to a surface by pressure on the belt strip, and the belt strip can then be removed from the carrier layer. For this purpose, the release force between the adhesive layer and the surface to which bonding is to take place is preferably selected to be greater than the release force between the belt strip and the carrier layer. The belt strip may likewise be an adhesive tape having a belt strip carrier layer and a belt strip adhesive layer.

In another embodiment of the die-cut part strip of the invention, there is a liner present which is arranged along the adhesive layer and covers the free sides of the adhesive layers of the die-cut parts. The liner may be disposed in strip form parallel to and at a distance from the strip belt. The die-cut part strip may be wound up with belt strip, die-cut part and liner to form the die-cut part roll. In both embodiments of the die-cut part strip, the wound-up die-cut part strip is wound with the belt strip on the inside of the turn and with the die-cut parts on the outside of the turn.

Figure 2:
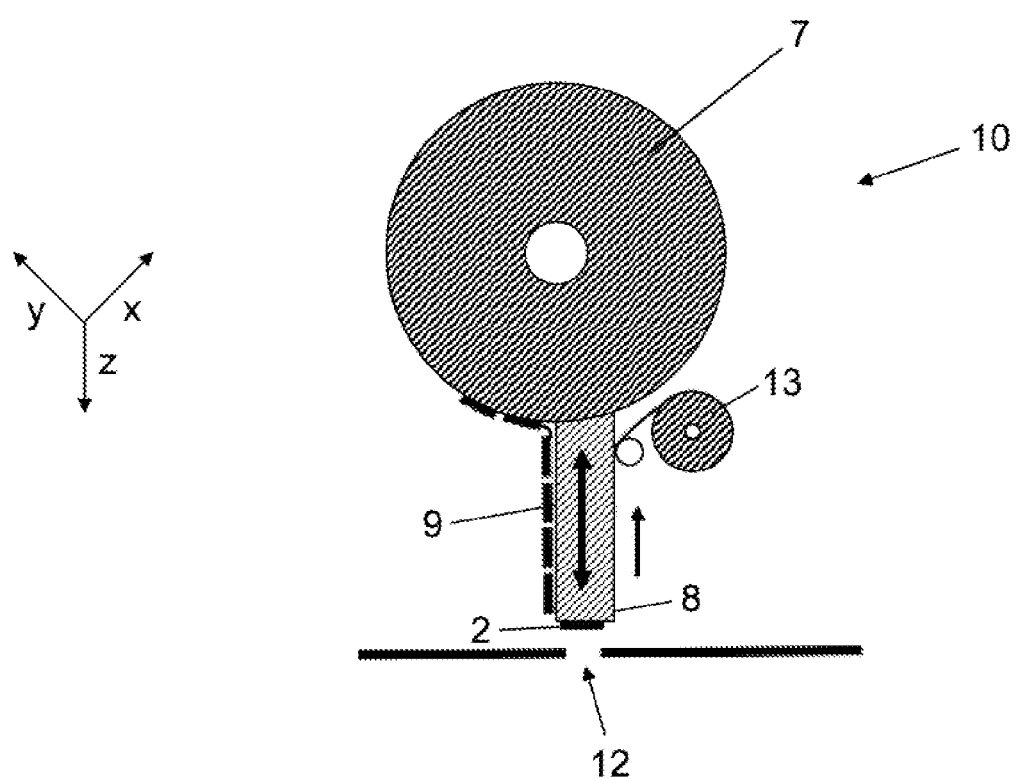
Figure 3:
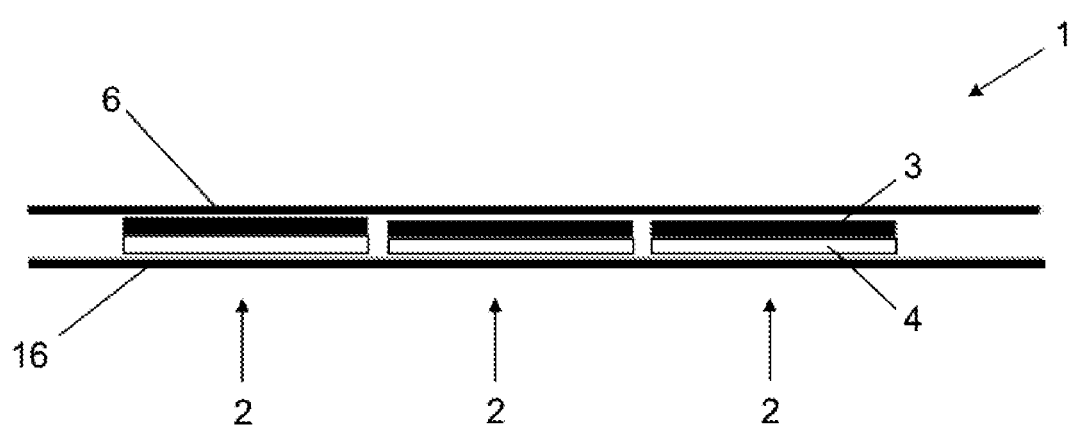
Figure 4:
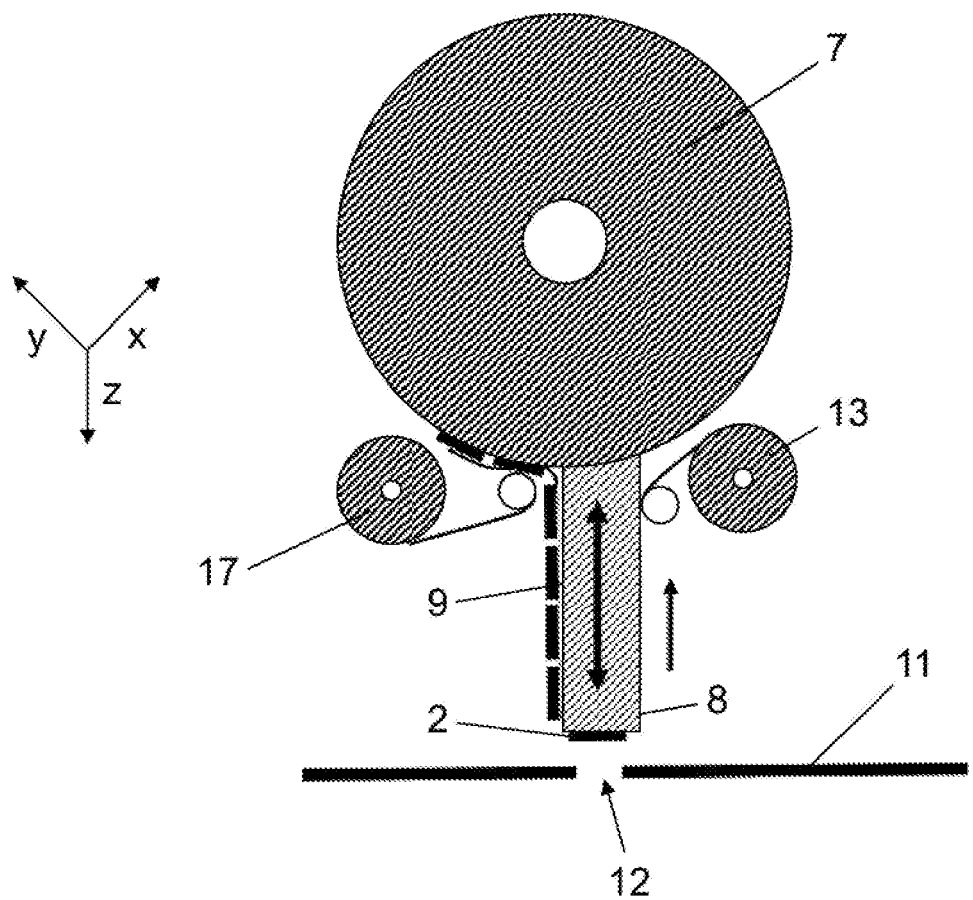

The invention is described with reference to two exemplary embodiments in four figures. In these figures, FIG. 1 shows a basic side view of a die-cut part strip of the invention in a first embodiment, FIG. 2 shows a basic side view of an applicator in a first embodiment for the die-cut part strip of the first embodiment, FIG. 3 shows a basic side view of a die-cut part strip in a second embodiment, and FIG. 4 shows a basic side view of an applicator of the invention in a second embodiment for the die-cut part strip in the second embodiment.

A die-cut part strip 1 shown in FIG. 1 has oriented die-cut parts 2 which are arranged in a row and are spaced apart from one another. The spacing of the die-cut parts 2 from one another is guided by the particular application; it may be 1 mm, 2 mm, 3 mm to 6 mm, or 7 mm. All values in between are disclosed as well. The die-cut parts 2 are disposed along a retaining belt 6.

The die-cut parts 2 each comprise a carrier layer 3 and an adhesive layer 4. The carrier layer 3 consists of customary plastics; by way of example, but without limitation, mention may be made of the following:

polyethylene, polypropylene—especially the oriented polypropylene (OPP) generated by monoaxial or biaxial drawing, cyclic olefin copolymers (COC), polyvinyl chloride (PVC), polyesters—especially polyethylene terephthalate (PET) and polyethylene naphthalate (PEN), ethylene-vinyl alcohol (EVOH), polyvinylidene chloride (PVDC), polyvinylidene fluoride (PVDF), polyacrylonitrile (PAN), polycarbonate (PC), polyamide (PA), polyethersulfone (PES) or polyimide (PI).

The adhesive layer 4 consists of a customary pressure-sensitive adhesive. The pressure-sensitive adhesive comprises a basis and a crosslinkable component, also referred to as reactive resin.

There are various materials, particularly non-polar elastomers, which are a suitable basis for pressure-sensitive adhesives.

Non-polar elastomers, such as vinylaromatic block copolymers, for example, are notable in that they can be dissolved in non-polar solvents—that is, in solvents and/or solvent mixtures whose polarity corresponds to ethyl acetate or which are less polar. These are, in particular, solvents and/or solvent mixtures having a dielectric constant of less than 6.1 [http://en.wikipedia.org/wiki/Solvent] and/or having Hansen parameters δP polar≤5.3; δH hydrogen bonding≤7.2 [Abbott, Steven and Hansen, Charles M. (2008) Hansen Solubility Parameters in Practice, ISBN 0-9551220-2-3 or Hansen, Charles M. (2007) Hansen solubility parameters: a user's handbook CRC Press, ISBN 0-8493-7248-8].

Where block copolymers are employed as elastomers, they contain at least one kind of block having a softening temperature of greater than 40° C. such as, for example, vinylaromatics (including partially or fully hydrogenated variants), methyl methacrylate, cyclohexyl methacrylate, isobornyl methacrylate and isobornyl acrylate.

With further preference, the block copolymer comprises a kind of block having a softening temperature of less than −20° C.

Examples of polymer blocks having low softening temperatures ("soft blocks") are polyethers such as, for example, polyethylene glycol, polypropylene glycol or polytetrahydrofuran, polydienes such as, for example, polybutadiene or polyisoprene, (partially) hydrogenated polydienes such as, for example, polyethylene-butylene, polyethylene-propylene or polybutylene-butadiene, polybutylene, polyisobutylene, polyalkyl vinyl ethers, and polymer blocks of α,β-unsaturated esters such as, in particular, acrylate copolymers.

In one version, the soft block here has a non-polar construction and in that case preferably comprises butylene or isobutylene or hydrogenated polydienes as homopolymer block or copolymer block, the latter preferably copolymerized with itself or with one another or with further comonomers which with particular preference are non-polar comonomers. Examples of suitable non-polar comonomers are (partially) hydrogenated polybutadiene, (partially) hydrogenated polyisoprene and/or polyolefins.

The crosslinkable component, also referred to as reactive resin, consists of a cyclic ether and is suitable for radiation crosslinking and optionally thermal crosslinking, with a softening temperature of less than 40° C., preferably of less than 20° C.

The reactive resins based on cyclic ethers are, more particularly, epoxides, namely compounds which carry at least one oxirane group, or oxetanes. They may be aromatic or, in particular, aliphatic or cycloaliphatic in nature.

Reactive resins that can be used may be monofunctional, difunctional, trifunctional, tetrafunctional or of higher functionality, up to being polyfunctional, with the functionality referring to the cyclic ether group.

Examples, without wishing to impose any limitation, are 3,4-epoxycyclohexylmethyl 3',4'-epoxycyclohexanecarboxylate (EEC) and derivates, dicyclopentadiene dioxide and derivates, 3-ethyl-3-oxetanemethanol and derivates, diglycidyl tetrahydrophthalate and derivatives, diglycidyl hexahydrophthalate and derivatives, ethane 1,2-diglycidyl ether and derivatives, propane 1,3-diglycidyl ether and derivatives, butane-1,4-diol diglycidyl ether and derivatives, higher alkane 1,n-diglycidyl ethers and derivatives, bis[(3,4-epoxycyclohexyl)methyl] adipate and derivatives, vinylcyclohexyl dioxide and derivatives, 1,4-cyclohexanedimethanol bis(3,4-epoxycyclohexanecarboxylate) and derivates, diglycidyl 4,5-epoxytetrahydrophthalate and derivatives, bis[1-ethyl(3-oxetanyl)methyl] ether and derivatives, pentaerythritol tetraglycidyl ether and derivates, bisphenol A diglycidyl ether (DGEBA), hydrogenated bisphenol A diglycidyl ether, bisphenol F diglycidyl ether, hydrogenated bisphenol F diglycidyl ether, epoxyphenol novolaks, hydrogenated epoxyphenol novolaks, epoxycresol novolaks, hydrogenated epoxycresol novolaks, 2-(7-oxabicyclo)spiro[1,3-dioxane-5,3'-[7]oxabicyclo[4.1.0]heptane], 1,4-bis((2,3-epoxypropoxy)methyl)cyclohexanes.

Reactive resins may be used in their monomeric form or else dimeric, trimeric form, etc., up to their oligomeric form.

Mixtures of reactive resins with one another, or else with other co-reactive compounds such as alcohols (monofunctional or polyfunctional) or vinyl ethers (monofunctional or polyfunctional), are likewise possible.

The adhesive layer 4 is applied over the full area of one side of the carrier layer 3. The one side of the carrier layer 3 is disposed opposite the retaining belt 6. The carrier layer 3 has a second side, facing the retaining belt 6, which is adhesively bonded to the retaining belt 6. The retaining belt 6 itself is an adhesive tape having a retaining belt carrier layer (not shown) and a retaining belt adhesive layer (not shown), to which the die-cut parts 2 are adhered the other way around relative to the prior art. The carrier layer 3 is disposed between the adhesive layer 4 and the retaining belt 6.

The die-cut part strip 1 according to FIG. 1 is initially wound on a die-cut part roll 7 according to FIG. 2. One end of the die-cut part strip 1 is parted from the die-cut part roll 7 and placed, according to FIG. 2, around a punch head 8 of a punch 9. The die-cut part roll 7 is placed onto a peg, which is not shown in detail, and is rotatably mounted on said peg. FIG. 2 shows merely the basic construction of an applicator 10 of the invention in the first embodiment.

To guide the die-cut part strip 1, of course, there are also deflection rollers and the like provided, which are not shown in the drawing in FIG. 2. Starting from the die-cut part roll 7, the die-cut part strip 1 is guided around the punch 9, and more particularly around the punch head 8. In application, the applicator 10 is movable back and forward by means of the flange-connected robot. The surface is shown in FIG. 2 with an opening 12. The applicator 10 of the invention is intended to stick one of the die-cut parts 2 to one of the openings 12 in each case, and so to close the opening 12.

The openings 12 customarily have a circular or oval opening cross section with a diameter of approximately 20 mm. The die-cut parts 2 therefore have a circular diameter of approximately 30 mm, thus forming an adhesive margin 5 mm wide around the opening 12. The advance distance of the die-cut part strip 1 is provided by a driven first winding roller 13.

The first winding roller 13 winds only the retaining belt 6, after the die-cut parts 2 have been successively adhered, in other words without the die-cut parts 2.

A control system is provided which rotates the first winding roller 13 cyclically at an angle which corresponds to the spacing of the die-cut parts 2 from one another, so that for each bonding operation there is exactly one of the die-cut parts 2 positioned on the punch head 8. In a bonding position, which is shown in FIG. 2, the die-cut part 2 is disposed on the punch head 8. In this state, it can be stuck onto the opening 12 by forward movement of the applicator 10.

Control of the applicator 10 operates as follows: A first sensor is provided, which is directed at the punch head 8 and which registers the presence of the die-cut part 2 on the punch head 8. When the die-cut part 2 is present, the first sensor delivers a signal to the control system, which delivers a halt signal to a drive of the first winding roller 13. The rotary movement of the first winding roller 13 is halted. The applicator 10 is pressed by a flange-connected robot and therefore the die-cut part 2 is pressed onto the opening 12. The applicator 10 is subsequently raised again and, coordinated by the control system, the first winding roller 13 is rotated a little, so that the die-cut part strip 1 does not hang loosely over the punch head 8, which is pulled in. The first winding roller 13 is then rotated further, so that the next die-cut part 2 is positioned on the retracted punch head 8. During the further transport of the die-cut part strip 1, the drive moves the entire applicator 10 from a position above the opening 12 shown in FIG. 2 into a subsequent position, in which the punch head 8 is positioned over the next opening 12. Either a second sensor may be provided, which registers the next opening 12 and delivers a signal to the control system, which halts the drive, so that the applicator 10 stops in the next position over the surface 11, or the opening pattern of the surface 11 is stored in the control system of the robot, so that the applicator 10 traverses the openings 12 one after another.

The die-cut part strip 1 of FIG. 1 is wound with the retaining belt 6 on the inside of the turn and with the die-cut parts 2 on the outside of the turn to form the die-cut part roll 7, so that, on unwinding, the adhesive layer 4 is exposed and can be adhered to the opening 12 when the die-cut part strip 1 is drawn over the punch head 8.

FIG. 3 shows a second embodiment of the die-cut part strip 1 of the invention, which relative to the first embodiment additionally comprises a liner 16. The liner 16 is disposed parallel to and at a distance from the retaining belt 6 along the die-cut part strip 1. The liner 16 covers the free adhesive side of the adhesive layer 4, thereby protecting the latter from contamination and so on. Furthermore, winding of the die-cut part strip 1 to form the die-cut part roll 7, and subsequent unwinding, are made easier. The release forces are such that the release force between the adhesive layer 4 and the liner 16 is less than the release force between the carrier layer 3 and the retaining belt 6.

A second embodiment of the applicator 10 of the invention is shown in FIG. 4. The second embodiment is intended for applying the die-cut parts 2 of the die-cut part strip 1 according to FIG. 3. Relative to the first applicator 10, the second applicator 10 additionally has a second winding roller 17, which is disposed on a feed side of the punch head 8, whereas the first winding roller 13 is disposed on the removal side of the punch head 8. The second winding roller 17 first rolls up the liner 16 on the feed side of the punch head 8, so that the adhesive layer 4 of the die-cut parts 2 is exposed, and then, according to FIG. 4, the die-cut part strip 1 freed from the liner 16 can be guided around the punch head 8. The actual adhering process takes place exactly as in the case of the first embodiment of the invention. Finally, the retaining belt 6 is rolled up again on the first winding roller 13. After the die-cut parts 2 have been consumed, the liner 16 is fully wound up on the second winding roller 17 and the retaining belt 6 is fully wound up on the first winding roller 13, and can be passed on for recycling.

LIST OF REFERENCE NUMERALS

1 die-cut part strip
2 die-cut part
3 carrier layer
4 adhesive layer
6 retaining belt
7 die-cut part roll
8 punch head
9 punch
10 applicator
11 surface
12 opening
13 first winding roller
16 liner
17 second winding roller

The invention claimed is:

1. An applicator for die-cut parts, the applicator being displaceable in a first back-and-forward movement in a z-direction that is perpendicular to a surface and a second movement in an xy-plane parallel to the surface and comprising:
a die-cut part strip having a belt strip and a row of die-cut parts disposed alongside one another on the belt strip;
a carrier layer of the die-cut parts disposed adjacent to the belt strip;
an adhesive layer of the die-cut parts disposed such that the carrier layer is disposed between the belt strip and the adhesive layer;
a liner disposed along the adhesive layer of the die-cut parts,
a punch head; and
a control system signal-conductingly connected to
a first sensor, which with a scanning region is directed at the punch head and registers the presence of one of the die-cut parts at the punch head, and
an actuating drive of the punch head, wherein the control system is configured to halt a first winding roller of the die-cut part strip when one of the die-cut parts is registered at the punch head and then to activate the actuating drive that drives the first back-and-forward movement and the second movement,
wherein
the carrier layer consists of one or more plastics selected from the group consisting of polyethylene, polypropylene, cyclic olefin copolymers, polyvinyl chloride, polyester, ethylene-vinyl alcohol, polyvinylidene chloride, polyvinylidene fluoride, polyacrylonitrile, polycarbonate, polyamide, polyethersulfone, and polyimide,
the adhesive layer of the die-cut parts faces away from the punch head as the die-cut part strip runs over the punch head, and the die-cut parts are pressable by means of the punch head onto the surface,
the control system is configured to move the punch head into a first position above the surface and to adhere a first die-cut part of the die-cut parts in a first surface position onto a first opening of the surface and, after the adhering of the first die-cut part on the first opening, the control system is configured to move the punch head into a second position above the surface, where a second die-cut part of the die-cut parts is adherable, through the first back-and-forward movement in the z-direction, onto a second opening of the surface,
a first release force between the belt strip and the carrier layer is greater than a second release force between the liner and the adhesive layer, and
the belt strip is an adhesive tape having a belt strip carrier layer and a belt strip adhesive layer.

2. The applicator according to claim 1, further comprising:
a die-cut part roll provided on a supply side of the punch head and by a first winding roller on a removal side of the punch head, the first winding roller being signal-conductingly connected to the control system, being able to accept winding of the belt strip of the die-cut part strip and moving the die-cut part strip cyclically onward.

3. The applicator according to claim 2, further comprising:
a second winding roller disposed at the supply side for accepting winding of the liner.

4. A method for applying die-cut parts to a surface, the method comprising:
applying die-cut parts of a die-cut part strip disposed alongside one another on a belt strip of the die-cut parts, wherein each die-cut part of the die-cut parts has a carrier layer and an adhesive layer, the carrier layer is disposed between the belt strip and the adhesive layer, a liner disposed along the adhesive layer of each die-cut parts, a first release force between the belt strip and the carrier layer is greater than a second release force between the liner and the adhesive layer, and the belt strip is an adhesive tape having a belt strip carrier layer and a belt strip adhesive layer;
moving the die-cut part strip over a punch head of a punch;
halting movement of the die-cut part strip when one die-cut part of the die-cut parts is positioned over the punch head and the punch;
directing a first sensor disposed at the punch head and recognizing the presence of the die-cut part over the punch head and, upon recognition of the die-cut part over the punch head, halting the die-cut part strip and moving the punch to the surface;
adhering the die-cut part to the surface such that an opening of the surface is closed by the die-cut part and an adhesive margin is disposed around the opening of the surface by the die-cut part; and
cycling the die-cut part strip on by one die-cut part of the die-cut parts.

5. The method according to claim 4, wherein a first position on the surface is determined and the die-cut part is stuck to the first position and, in that a second position on the surface is determined, the punch during the cycling is moved to the second position.

6. A die-cut part strip comprising:
a belt strip that is an adhesive tape having a belt strip carrier and a belt strip adhesive layer;
a series of die-cut parts disposed alongside one another on the belt strip, wherein each die-cut part of the die-cut parts has a carrier layer and an adhesive layer and the carrier layer is disposed between the belt strip and the adhesive layer; and
a liner disposed along the adhesive layers of the die-cut parts,
wherein
a first release force between the belt strip and the carrier layer of each die-cut part is greater than a second release force between the liner and the adhesive layer of each die-cut part, and
the carrier layer consists of one or more plastics selected from the group consisting of polyethylene, polypropylene, cyclic olefin copolymers, polyvinyl chloride, polyester, ethylene-vinyl alcohol, polyvinylidene chloride, polyvinylidene fluoride, polyacrylonitrile, polycarbonate, polyamide, polyethersulfone, and polyimide.

* * * * *